May 22, 1962 A. L. LEE 3,035,655
DRIVE MEANS FOR A MINE HAULAGE VEHICLE
Original Filed Feb. 26, 1957 7 Sheets-Sheet 3

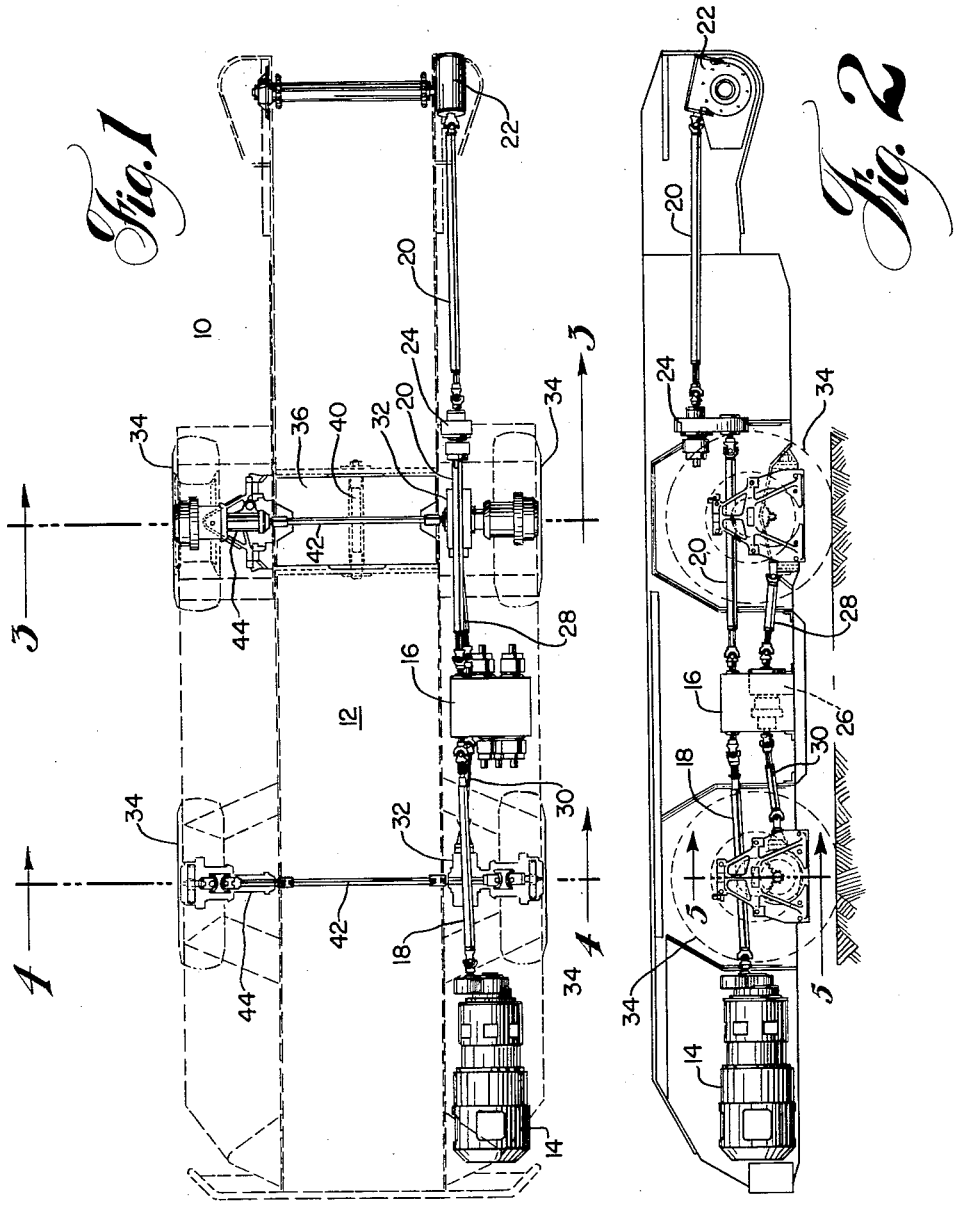

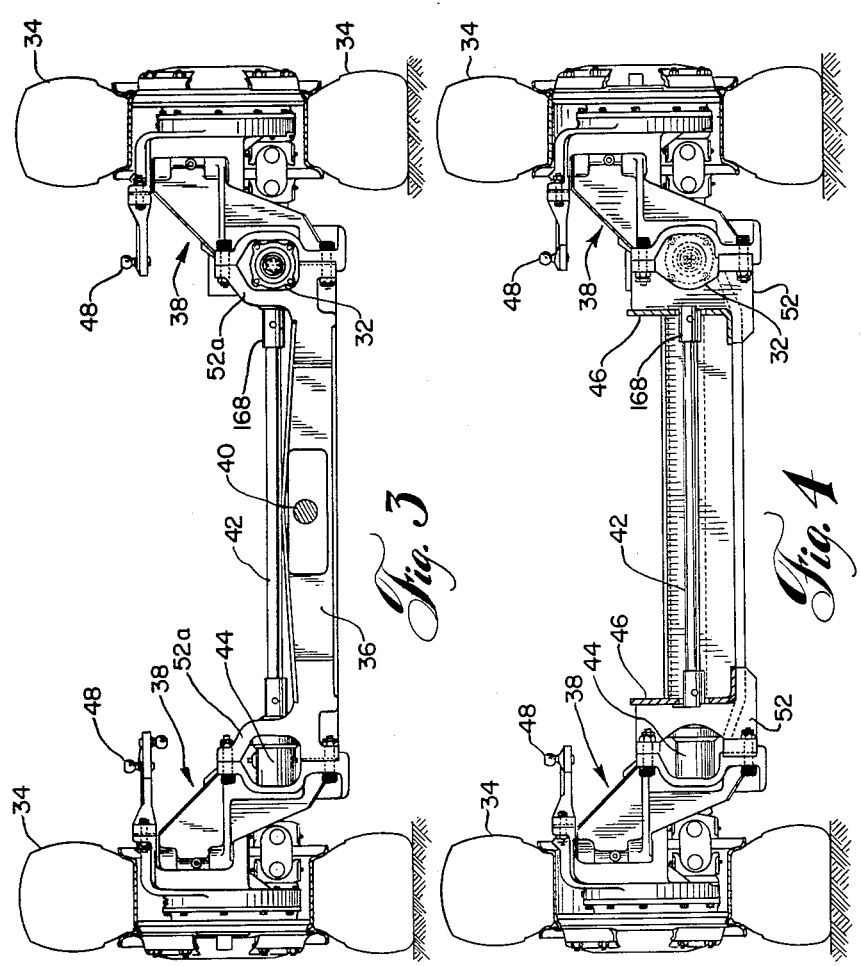

INVENTOR.
ARTHUR L. LEE
BY Stanley J Price
his ATTORNEY

May 22, 1962 A. L. LEE 3,035,655
DRIVE MEANS FOR A MINE HAULAGE VEHICLE
Original Filed Feb. 26, 1957 7 Sheets-Sheet 4

INVENTOR.
ARTHUR L. LEE
BY Stanley J Price
his ATTORNEY

May 22, 1962 A. L. LEE 3,035,655
DRIVE MEANS FOR A MINE HAULAGE VEHICLE
Original Filed Feb. 26, 1957 7 Sheets-Sheet 5

INVENTOR.
ARTHUR L. LEE
BY
his ATTORNEY

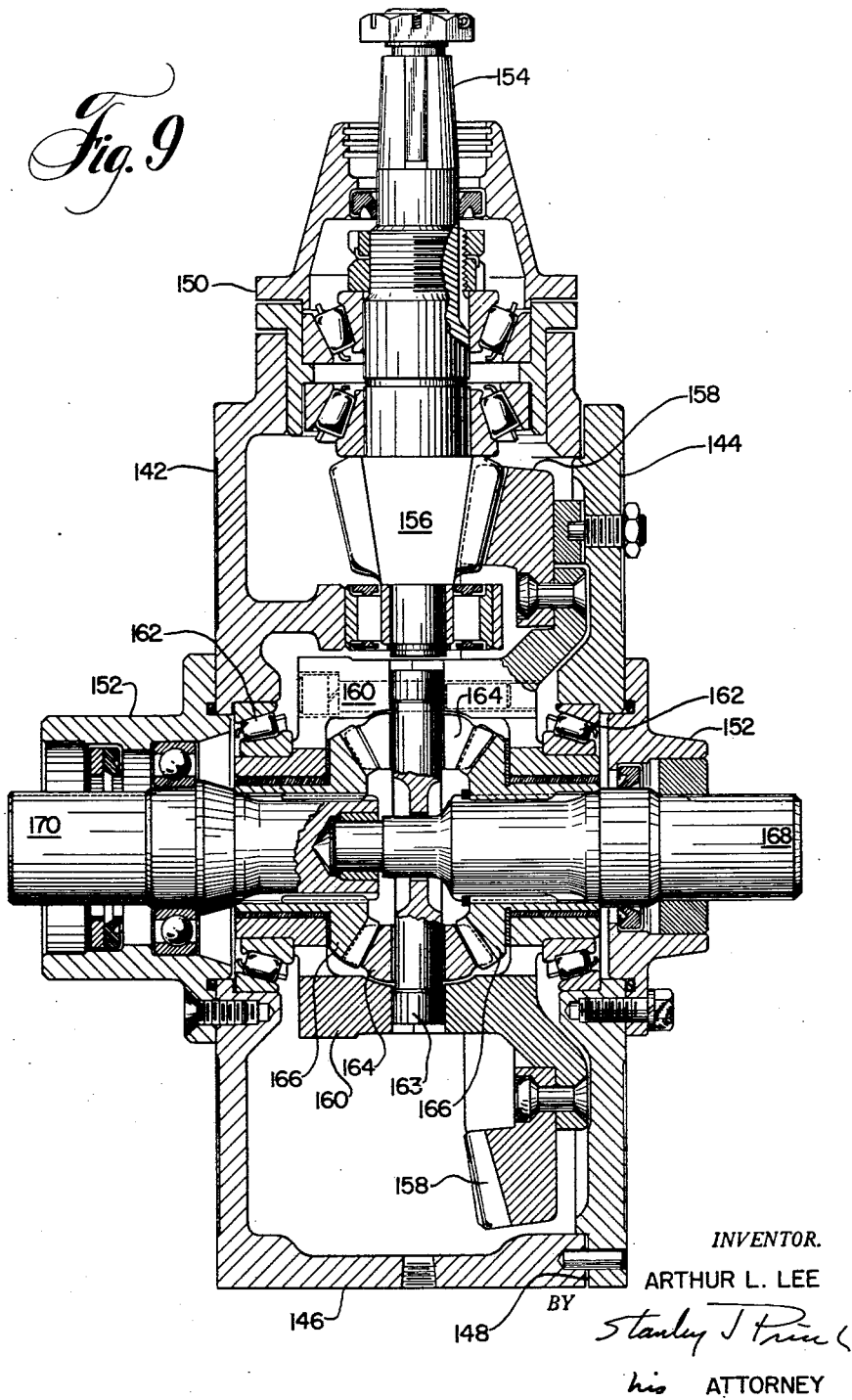

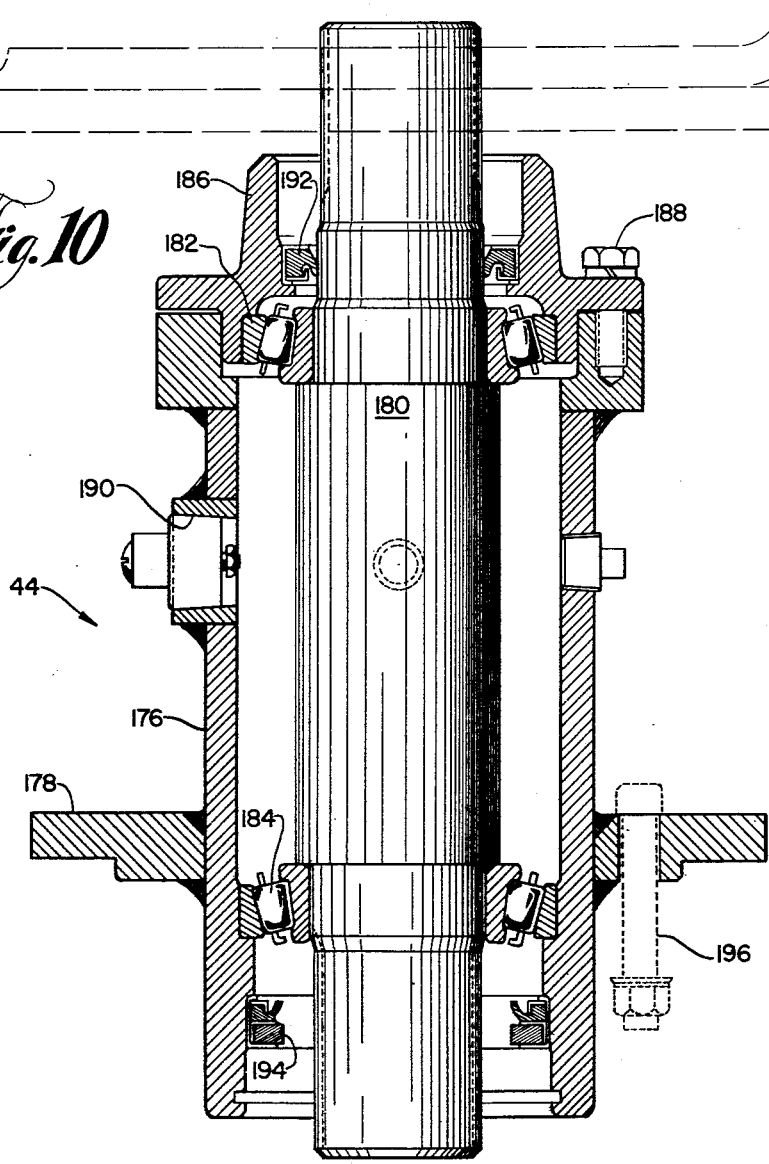

United States Patent Office 3,035,655
Patented May 22, 1962

3,035,655
DRIVE MEANS FOR A MINE HAULAGE VEHICLE
Arthur L. Lee, Columbus, Ohio, assignor to Consolidation Coal Company, Pittsburgh, Pa., a corporation of Pennsylvania
Original application Feb. 26, 1957, Ser. No. 642,431, now Patent No. 2,924,288, dated Feb. 9, 1960. Divided and this application Mar. 17, 1959, Ser. No. 799,924
4 Claims. (Cl. 180—45)

This invention relates to a drive mechanism for a four wheel driven and four wheel steered type haulage vehicle and more particularly to the power driven and steerable wheel assemblies mounted on the vehicle frame.

This application is a division of my copending application Serial No. 642,431, filed February 26, 1957, entitled "Drive Means for a Mine Haulage Vehicle," now U.S. Patent No. 2,924,288, which in turn is a continuation in part of application Serial No. 535,919, filed September 22, 1955, entitled "Mine Haulage Vehicle," now abandoned.

The principal object of this invention is to provide an improved drive mechanism for a haulage vehicle wherein the wheel assemblies are freely interchangeable.

Another object of this invention is to provide a differential mechanism including a differential carrier which is freely interchangeable to differentially drive either the front pair of wheels or the rear pair of wheels.

Another object of this invention is to provide a drive mechanism for a haulage vehicle wherein the differential is positioned outside of the vehicle frame and detachably secured to the wheel assemblies.

A further object of this invention is to provide a power driven steerable wheel assembly in which the king pin and the drive gearing are arranged within the lateral limits of the wheel.

Another object of this invention is to provide a power driven steerable wheel assembly wherein the moving parts are easily lubricated without dismantling the wheel from the vehicle.

Still another object of this invention is to provide a power driven steerable wheel assembly that requires the minimum of machining, is rugged in construction, economical to manufacture and easy to assemble.

This invention comprises the new and improved construction and combination of parts and their operating relation to each other which will be described more fully hereinafter and the novelty of which will be particularly pointed out and distinctly claimed.

In the accompanying drawings to be taken as part of this specification there is clearly and fully illustrated a preferred embodiment of this invention, in which drawings:

FIGURE 1 is a top plan view of a shuttle car illustrating the driving connections between the prime mover and the four wheel assemblies.

FIGURE 2 is a view in elevation similar to FIGURE 1.

FIGURE 3 is a view in vertical section taken along the line 3—3 in FIGURE 1 illustrating the drive connection between a pair of wheels on opposite sides of the haulage vehicle.

FIGURE 4 is a view in vertical section taken along the line 4—4 in FIGURE 1 illustrating the driving connection between the other pair of wheels positioned on opposite sides of the haulage vehicle.

FIGURE 9 is a sectional plan view taken along the lines 9—9 in FIGURE 5 illustrating in detail the differential mechanism.

FIGURE 10 is an enlarged view in section illustrating the bearing carrier member.

Figure 5:
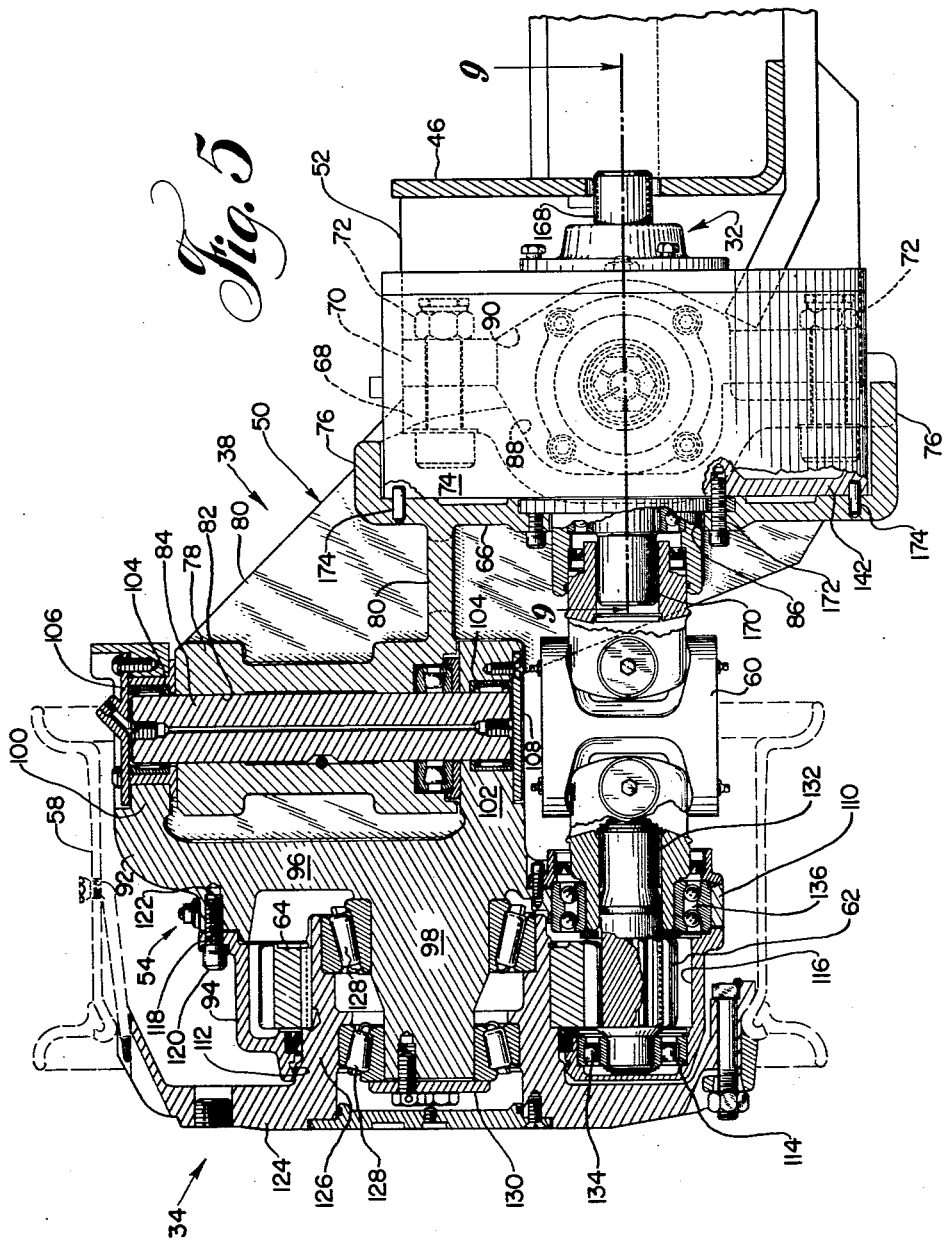
FIGURE 5 is a detail sectional view taken along the line 5—5 in FIGURE 2 illustrating a wheel assembly with the differential mechanism positioned between the wheel assembly and the vehicle frame.

Referring to the drawings in which like numerals refer to like parts throughout, and particularly to FIGURES 1 and 2, there is illustrated a haulage vehicle 10 having a material receiving portion 12 extending lengthwise thereof. The material haulage portion 12 is provided with a conveyor means (not shown) adapted to discharge the material therefrom. The haulage vehicle 10 is provided with a prime mover 14, which in this instance is an electric motor. The prime mover 14 is connected to a transmission 16 by means of a propeller shaft 18. The transmission 16 is adapted to provide a plurality of speeds in both directions while the prime mover 14 maintains a constant output speed. Auxiliary output shafting 20 is connected at one end to the transmission 16 and at its other end to a conveyor drive mechanism 22. A clutch member 24 controls the drive of the conveyor drive mechanism 22. The transmission 16 includes a differential diagrammatically indicated at 26 which is driven by the output gear of the transmission and provides differential drive to the longitudinally extending output shafts 28 and 30. The output shafts 28 and 30, though driven through differential 26, both rotate in the same direction. The output shaft 28 extends toward the front end of the shuttle car 10 and is connected at its free end to a differential mechanism 32. Similarly the output shaft 30 extends longitudinally toward the rear of the haulage vehicle 10 and is connected to another differential 32 which is similar in construction to the first named differential.

The haulage vehicle 10 is propelled by a front pair of driven wheels and a rear pair of driven wheels 34 which receive their driving power from a single prime mover 14. The front wheels 34 are a part of a pair of duplicate wheel assemblies 38 which are detachably secured to the opposite ends 52ᵃ of an equalizer axle 36 (FIG. 3). The equalizer axle end portions 52ᵃ are similar in shape to securing brackets 52 later described. The equalizer axle 36 is connected to the haulage vehicle 10 by means of the longitudinally extending pin member 40. A transverse shaft 42 connects the differential 32 with a bearing carrier 44. Power delivered from the prime mover 14 is transmitted through the longitudinally extending output shaft 28 to the differential 32 (FIGS. 1 and 2) and from the differential 32 to the adjacent wheel assembly 38, as will be later explained, and to the opposite wheel assembly by means of the transverse shaft 42, as will also be later explained. The rear pair of wheels 34 are positioned adjacent to the side walls of haulage vehicle frame 46 and are a part of the wheel assemblies 38 which are identical in construction to the pair of front wheel assemblies 38. The rear wheel assemblies 38 are detachably secured to securing brackets 52 and the securing brackets 52 in turn are rigidly secured to the haulage vehicle frame 46. In a similar manner power is delivered from the prime mover 14 through the transmission 16 to the other longitudinally extending output shaft 30 (FIGS. 1 and 2). The output shaft 30 is connected at its free end to the other differential 32 to provide power to the adjacent wheel 34 and power to the opposite wheel 34 by means of the transverse shaft 42 and bearing carrier 44. It should be noted that the transverse power delivery shafts 42 extend below the horizontal axis of the wheels 34 thus providing additional haulage area within the material haulage portion 12. Each of the wheel assemblies 38 are provided with steering arms 48 which are interconnected to each other by a steering mechanism (not shown) so that the four wheels are both power driven and steerable.

FIGURE 5 illustrates in detail a wheel assembly 38, which includes a wheel 34, detachably secured to a securing bracket 52. Since this is a view of a rear wheel assembly, the securing bracket 52 is rigidly secured to the vehicle frame 46 as by welding or the like.

It should again be noted in regard to FIGURE 3 that the transverse equalizer axle 36 has end portions 52a which are formed as duplicates of the securing brackets 52 but in this instance the securing bracket portions 52a are integral with the equalizer axle 36 and not secured to the vehicle frame portions 46 as illustrated in FIGURE 4.

The wheel assembly 38 has a supporting bracket 50 and a spindle bracket assembly 54 pivotally connected thereto. The wheel 34 is rotatably positioned on the spindle bracket 54 and has a conventional wheel rim 58 mounted thereon. The wheel 34 is driven by the differential mechanism 32 through a universal joint 60 and a pinion gear 62 supported by the spindle bracket assembly 54. A large ring gear 64 is secured to the wheel 34 and is in meshing relation with the small pinion gear 62 so that upon rotative movement of the pinion gear 62 the wheel 34 is driven by means of the large ring gear 64. Throughout this specification the term wheel assembly includes the following structure: wheel 34, wheel rim 58, supporting bracket 50, spindle bracket 54, universal joint 60 and drive gearing 62 and 64.

In my wheel assembly 38 the wheel 34 is steerable by means of the pivotal connection between the supporting bracket 50 and the spindle bracket assembly 54 and is driven by means of the power connection described. It should be noted that both the pivotal connection and the drive gearing are substantially within the lateral limits of the wheel rim 58 thus providing a compact wheel assembly that may be positioned closely adjacent the vehicle frame so that the vehicle may be operated in confined spaces.

Referring in detail to the structure disclosed in FIGURE 5, there is shown a supporting bracket 50 having a vertically extending body portion 66 with a pair of spaced vertical flange portions 68. The flange portions 68 are rigidly and detachably connected to outwardly extending flange portions 70 of the securing bracket 52 by means of bolts 72 thereby rigidly and detachably securing the supporting bracket 50 to the securing bracket 52. The flange portions 68 form a recessed portion indicated at 74 therebetween. The supporting bracket body portion also has a pair of spaced inwardly extending horizontal flange portions 76 which form with the vertical flange portion 68 a circular recessed portion. The supporting bracket 50 has a king pin receiving portion 78 extending outwardly and upwardly therefrom. A plurality of reinforcing rib members 80 rigidly connect the king pin receiving portion 78 to the supporting bracket body portion 66. The king pin receiving portion 78 has a vertical cylindrical bore 82 therethrough which is adapted to receive king pin 84.

The supporting bracket body portion 66 has a horizontal bore 86 therethrough and the vertical flange portions 68 have cut away portions 88. Similarly the securing bracket 52 has cut away portions 90 which are aligned with the cut away portions 88 in the supporting bracket 50. The spindle bracket assembly 54 includes a spindle bracket 92 and a spindle bracket cover 94. The spindle bracket 92 has a body portion 96 with a spindle member 98 extending outwardly therefrom and a pair of horizontally spaced flange portions 100 and 102 extending inwardly therehfrom.

The flange portions 100 and 102 have a pair of vertically aligned apertures 104 therethrough. The supporting bracket king pin receiving portion 78 is positioned between the spindle bracket flange portions 100 and 102 with the cylindrical bore 60 aligned with the spindle bracket apertures 104. A king pin 84 is positioned in the aligned apertures and bore and secured therein by means of cap members 106 and 108. In this manner the spindle bracket 92 is pivotally secured to the supporting bracket 50 along a substantially vertical axis.

Figures 7, 8:
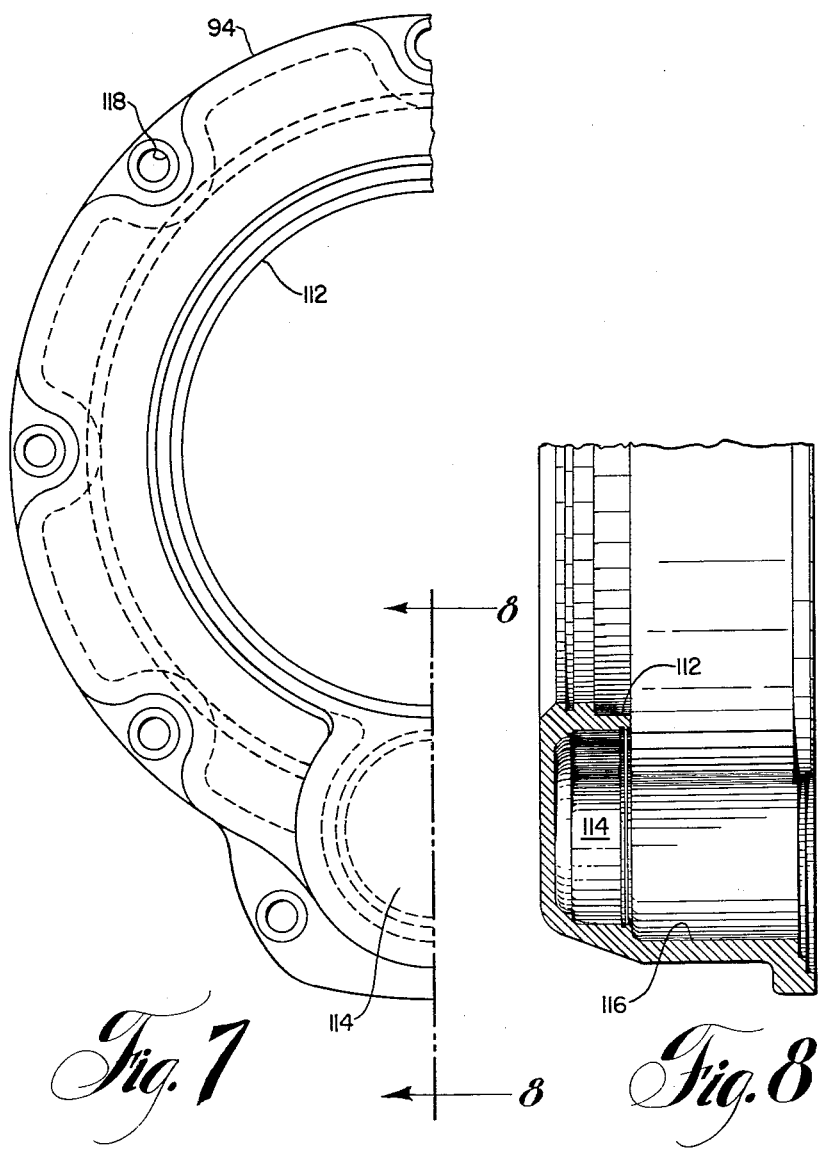
FIGURE 7 is an enlarged fragmentary view in elevation of the spindle bracket cover shown in FIGURE 5.
FIGURE 8 is a sectional view taken along the line 8—8 in FIGURE 7 showing in detail the outboard bearing carrier portion of the spindle bracket cover.

The spindle bracket body portion has an annular bearing carrier portion 110 arranged below the spindle 98. The spindle bracket cover 94 is dish shaped (FIGS. 5, 7 and 8) and has a central aperture 112 therethrough. The spindle bracket cover 94 also has an outboard bearing supporting portion 114 positioned below the aperture 112 and a pinion gear receiving portion 116. The bearing supporting portion 114 and pinion gear receiving portion 116 are axially aligned with the spindle bracket annular bearing carrier portion 110. The spindle bracket cover member 94 has a plurality of apertures 118 therethrough around its outer periphery and is secured to the spindle bracket 92 by means of bolts 120 extending therethrough and into aligned threaded bores 122 in the spindle bracket 92.

The wheel 34 has a body portion 124 with a cylindrical hub portion 126 extending inwardly therefrom. The wheel hub portion 126 is suitably supported on roller bearings 128 positioned on the spindle 98 so that the wheel member 34 is rotatable relative to the spindle 98. A cap member 130 retains the bearing 128 in proper position on the spindle 98. The wheel hub 126 has an annular external toothed ring gear 64 rigidly secured thereto for rotation therewith. As stated, the wheel member 34 has a conventional wheel rim 58 secured to its outer periphery. It should again be noted at this point that the wheel assembly 38 is so constructed that both the king pin 84 and the driven gear 64 are confined substantially to the lateral limits of the wheel rim 58 to present a compact driven and steerable wheel assembly of limited lateral dimension.

A power transmitting shaft 132 is rotatably supported at its outboard end by means of roller bearings 134 positioned within the spindle cover outboard bearing supporting portion 114. The inboard end of the shaft 132 is rotatably supported in bearings 136 secured to the spindle bracket annular bearing carrier portion 110. The pinion gear 62 is splined to the power transmitting shaft 132 and is positioned in the pinion gear receiving portion 116. The pinion gear 62 is in meshing relation with the large ring gear 74 which is secured to the wheel hub 126. A universal joint 60 connects the inboard end of the shaft 132 with a transverse output shaft of the differential 32 so that output drive power from the differential 32 is transmitted through the universal joint 60 and power transmitting shaft 132 to pinion gear 64 and the large ring gear 38.

Figure 6:
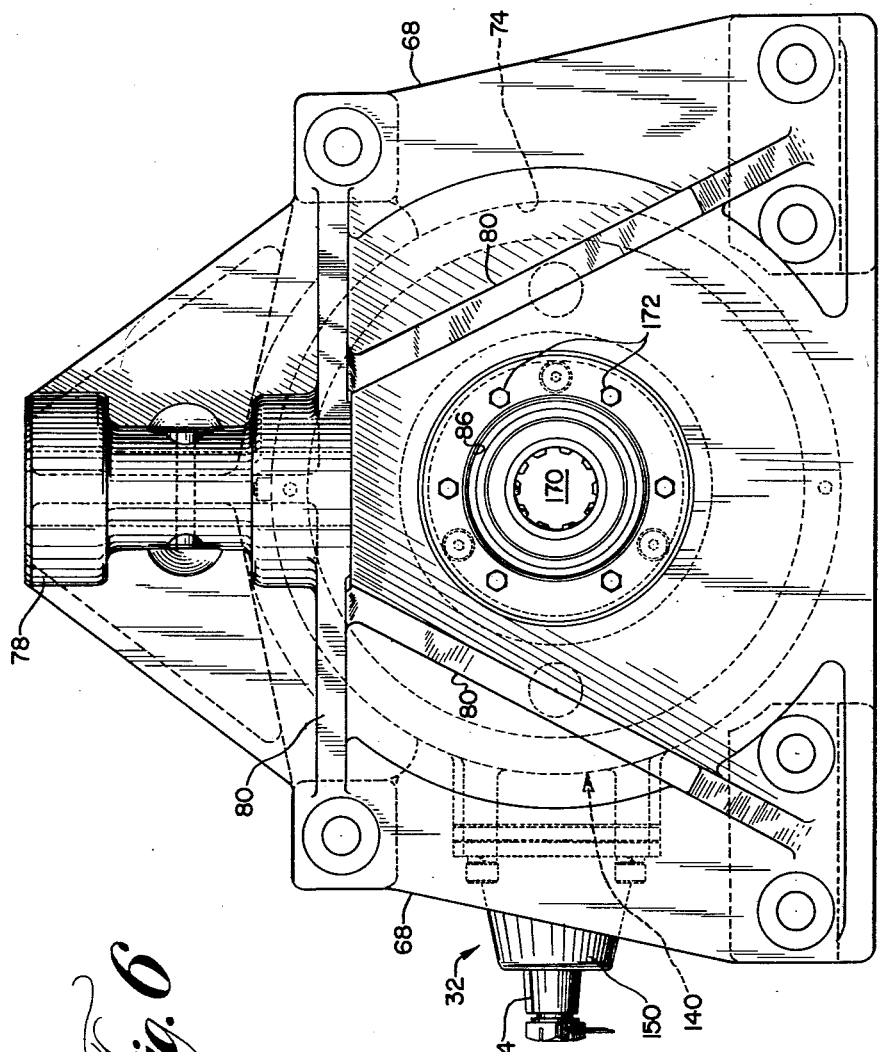
FIGURE 6 is a view in front elevation of the supporting bracket and differential mechanism illustrated in FIGURE 5.

The differential 32 illustrated in FIGURES 5, 6 and 9 has a carrier 140 with circular side walls 142 and 144. The side wall 142 has a circular inwardly extending circumferential flange portion 146 which abuts the inner circumferential edge 148 of the other side wall 144 thus forming a cylindrical carrier. The circular flange portion 146 has a differential power input shaft receiving portion 150 extending therefrom. The side walls 142 and 144 have output shaft supporting portions 152 extending therefrom along the longitudinal axis of the housing 140.

The view of FIGURE 9 is taken along the line 9—9 of FIGURE 5 which in turn illustrates the arrangement of the wheel assembly 38 as it is connected to a rear wheel 34. The power output shaft 30 from the transmission 16 is connected to the power input shaft 154 of the differential 32 which is rotatably supported in the input shaft housing 150. A bevel gear 156 is secured to the end of the differential power input shaft 154 and is in meshing relation with a large bevel ring gear 158. The ring gear 158 has a housing portion 160 which is rotatably supported on bearings 162 to rotate along an axis transverse to the axis of the differential power input shaft 154. A differential cross 163 extends through and is secured to the housing portion 160 which is rotatably secured on bearings 162. Planet type bevel gears 164 are rotatably secured to the arms of the cross 163 and are in meshing relation with a pair of bevel gears 166. The gears 166 are secured to transversely extending power output shafts 168 and 170. In FIGURE 5 transverse shaft 170 is connected to the universal connecting means 60. The other transversely extending output shaft 168 is connected to the transverse shaft 142 and provides differential drive for the opposite wheel assembly 38 through the bearing carrier 44. As described the differential carrier side wall 142 is secured to the inner wall of the supporting bracket body portion 66 by means of a plurality of bolts 172. The pin members 174 (FIG. 5) adjacent the inwardly extending horizontal brackets 76 restrain the differential carrier 140 from rotation.

In order to provide proper drive for the vehicle 10 the pair of transverse shafts 42 (FIG. 1) must rotate in the same direction. Since the power output shafts 28 and 30 from the transmission differential 26 are arranged to rotate in the same direction, a reversal in the direction of rotation must be made between one of the output shafts 28 or 30 and one of the transverse shafts 42. This is accomplished in my vehicle by employing a pair of differentials of identical construction housed in identical carriers and having in one instance the differential 32 secured to the supporting bracket 50 by the side wall 142 (rear wheels) and in the other instance (front wheels) the differential 32 secured to the supporting bracket 50 by the side wall 144. Thus, as in FIGURE 1, the large ring gear 158 would be adjacent the wheel assembly 38 in the rear wheels and would be adjacent the vehicle frame in the differential 32 driving the front wheels. In this manner the ring gear 158 would be on the outboard side of the differential for the rear wheels and on the inboard side of the differential for the front wheels. With this arrangement identical differentials 32 are employed for both the front and rear wheels and yet the effective direction of rotation of one of the longitudinally extending power output shafts 28 or 30 can be reversed so that both transverse shafts 42 and the gearing in the wheel assemblies 38 connected thereto rotate in the proper direction.

As shown in FIGURES 1, 3 and 4 the transverse shaft 42 is connected at one end to a differential output shaft 168 and at the other end to a bearing carrier 44. The bearing carrier 44 is illustrated in detail in FIGURE 10 and has a cylindrical housing 176 with a securing flange 178 extending radially therefrom. A connecting shaft 180 is rotatably supported within the housing 176 by bearings 182 and 184. The bearing 182 is positioned in a cap member 186 that is detachably secured to the housing 176 by means of bolts 188. An aperture 190 is provided in the housing 176 to provide a means for lubricating bearings 182 and 184. Ring members 192 and 194 seal the open ends of the housing 176 to retain the lubricant therein.

The bearing housing 176 is secured to the wheel assembly supporting member body portion 66 in the same manner as the differential 32. Bolts 196 extend through the apertures in the supporting bracket body portion 66 and the bearing housing flange 178 to detachably secure the bearing carrier 44 to the wheel assembly 38.

With this arrangement the driving connections between a pair of wheel assemblies 38 on opposite sides of the vehicle include a differential 32, a transverse shaft 42 and a bearing carrier 44. The positioning of the bearing carrier 44 and the differential 32 is a matter of choice and is dependent only upon the relative position of the power input shafts. Thus, with my new drive means, a modification of the haulage vehicle to change the position of the prime mover and transmission to the opposite side of the vehicle would simply require reversing the relative positions of the bearing carrier 44 and the differential carrier 140.

From the foregoing description of my drive means it is apparent that all wheel assemblies 38, differentials 32 and bearing carriers 44 are interchangeable, thus minimizing the spare parts inventories, and eliminating possible error in assembly or repair of the vehicle drive means. My wheel assembly 38 may be easily lubricated while the wheel 34 is mounted thereon. Also, the drive gearing for the wheel and the differential mechanism are housed within separate enclosures so that the lubricant within these enclosures remains substantially free of contamination from dust or other contaminants. This feature of my wheel assembly reduces the wear of moving parts and assures longer trouble free performance of my vehicle.

Although I have described both the differential and bearing carrier as being detachably secured to the wheel assembly supporting bracket body portion, it should be understood that the differential 32 or the bearing carrier 44 could be secured, with equal ease, to the vehicle frame side portions 46.

According to the provisions of the patent statute, I have explained the principle, preferred construction and mode of operation of my invention and have illustrated and described what I now consider to represent its best embodiment. However, I desire to have it understood that, within the scope of the appended claims, the invention may be practiced otherwise than as specifically illustrated and described.

I claim:

1. A haulage vehicle including a mobile body having a material receiving portion extending lengthwise thereof, a pair of laterally spaced power driven steerable wheels for supporting one end of said body, a second pair of laterally spaced power driven steerable wheels for supporting the other end of said body, a single prime mover for driving all of said wheels, a multi-speed forward and reverse transmission operatively connected to said single prime mover, a pair of duplicate differentials having substantially duplicate cylindrical carriers, said duplicate cylindrical carriers each having a power input shaft journaled for rotation in said carrier and extending radially therefrom between first and second spaced apart circular side walls, said side walls being equidistant from the axis of said power input shaft, each of said differentials having a large ring gear supported within said carrier adjacent said first side wall, one of said differentials positioned adjacent said first pair of wheels with said first side wall mounted adjacent said material receiving portion, the other of said differentials positioned adjacent said second pair of wheels with said second side wall mounted adjacent said material receiving portion, driving connections between said transmission and each of said differential power input shafts, said driving connections arranged to rotate in the same direction, said differentials being connected to said driving connections so that said ring gears of said differentials are arranged to rotate in the same direction, said prime mover, transmission, driving connections and differentials arranged along one side of said body, and other driving connections between said differentials and said wheels including a pair of transverse shafts extending across said body for connecting said differentials to the respective wheels on the opposite side of said body, said other driving connections arranged to rotate in the same direction.

2. A haulage vehicle including a mobile body having a material receiving portion extending lengthwise thereof, a pair of laterally spaced power driven steerable wheels for supporting one end of said body, a second pair of laterally spaced power driven steerable wheels for supporting the other end of said body, each of said wheels being a part of substantially identical wheel assemblies, said assemblies also including a wheel bracket pivotally connected to a supporting bracket and drive gearing for said wheel, a single prime mover for driving all of said wheels positioned adjacent one end and on one side of said vehicle, a multi-speed forward and reverse transmission operatively connected to said single prime mover and positioned on said side of said vehicle intermediate said wheels, a pair of duplicate differentials each having cylindrical differential carriers with first and second spaced apart circular side walls and a power input shaft extending radially from said cylindrical carrier equidistantly between said side walls positioned at said side of said vehicle, one of said differentials positioned adjacent said first pair of wheels, the second differential positioned adjacent said second pair of wheels, a pair of power output shafts extending in opposite directions from said transmission and rotating in the same direction, said output shafts operatively connected to said differential power input shafts, said differentials being connected to said adjacent wheel assembly supporting brackets, one of said differentials being positioned with said first side wall adjacent said wheel bracket, the other of said differentials being positioned with said second side wall adjacent said wheel bracket, the ring gears of said differentials being so arranged to rotate in the same direction, and other driving connections between said differentials and said wheel assemblies including a pair of transverse shafts extending across said body for connecting said differentials to the respective wheel assemblies on the opposite side of said body, said other driving connections arranged to rotate in the same direction.

3. A haulage vehicle including a mobile body having a material receiving portion extending lengthwise thereof, particularly adapted for use in confined spaces, a pair of laterally spaced power driven steerable wheels for supporting one end of said body, a second pair of laterally spaced power driven steerable wheels for supporting the other end of said body, each of said wheels being a part of substantially identical wheel assemblies, said assemblies also including a wheel bracket pivotally connected to a supporting bracket by means of a king pin connection, and drive gearing for said wheel, said king pin member and said drive gearing being mounted substantially within the lateral limits of the rim of said wheel, a single prime mover for driving all of said wheels positioned adjacent one end and on one side of said vehicle, a multi-speed forward and reverse transmission operatively connected to said single prime mover, said transmission having differential gearing connected with its output gearing and output shaft connections extending in opposite directions from said differential gearing said transmission positioned on said side of said vehicle intermediate said wheels, a pair of duplicate differentials each having cylindrical differential carriers with first and second spaced apart circular side walls and a power input shaft extending radially from said cylindrical carrier equidistantly between said side walls positioned at said side of said vehicle, one of said differentials positioned adjacent said first pair of wheels, the second differential positioned adjacent said second pair of wheels, a pair of oppositely extending power output shafts connected at one end to said transmission output shaft connections and at their other end to said differential power input shafts, said output shafts arranged to rotate in the same direction, said differentials being connected to said adjacent wheel assembly supporting brackets, one of said differentials being positioned with said first side wall adjacent said wheel bracket, the other of said differentials being positioned with said second side wall adjacent said bracket, the ring gears of said differentials being so arranged to rotate in same direction, and other driving connections between said differentials and said wheel assemblies including a pair of transverse shafts extending across said body for connecting said differentials to the respective wheel assemblies on the opposite side of said body, said other driving connections arranged to rotate in the same direction.

4. A differential gear set comprising a cylindrical carrier having first and second spaced apart circular side walls, a power input shaft journaled for rotation within said carrier and extending radially outwardly from said carrier equidistantly between said first and second side walls, a differential house journaled for rotation within said carrier and having a ring bevel gear fixed thereto, said ring bevel gear lying in a plane parallel to said first and second side walls and adjacent to said first side wall, a driving connection between said power input shaft and said ring bevel gear, a pair of differential power output shafts journaled for rotation within said carrier side walls coaxial with said ring bevel gear, each of said output shafts having a bevel gear fixed thereto, a differential cross member supported by said house, said differential cross having bevel pinions rotatably supported thereby, said bevel pinions each being in meshing relation with both of said output shaft bevel gears, said differential carrier being symmetrical about the axis of said power input shaft whereby said differential carrier may be dismounted to be rotated 180° about the axis of said input shaft and remounted in order to reverse the direction of rotation of said ring bevel gear for a given direction of rotation of said input shaft.

References Cited in the file of this patent
UNITED STATES PATENTS

| | | |
|---|---|---|
| 1,635,236 | Tolson | July 12, 1927 |
| 2,456,616 | Buckendale | Dec. 21, 1948 |
| 2,754,015 | Lee | July 10, 1956 |
| 2,924,288 | Lee | Feb. 9, 1960 |